United States Patent [19]

Mackenzie et al.

[11] 4,358,237

[45] Nov. 9, 1982

[54] RECOVERED SOLID WASTE STORAGE BUILDING AND METHOD

[75] Inventors: Harold B. Mackenzie, Wheaton, Ill.; Ingvar G. Anderson, Houston, Tex.

[73] Assignee: New Life Foundation, Wheaton, Ill.

[21] Appl. No.: 164,295

[22] Filed: Jun. 30, 1980

[51] Int. Cl.³ .................. B65G 65/32; B65G 65/42
[52] U.S. Cl. ............................ 414/300; 414/287; 414/304; 414/786
[58] Field of Search .............. 414/177, 266, 268, 269, 414/272, 288, 293, 299, 300, 304, 327, 786; 198/369, 530, 557, 569, 616

[56] References Cited

U.S. PATENT DOCUMENTS

| | | | |
|---|---|---|---|
| 1,535,039 | 4/1925 | Rettler | 414/327 |
| 2,134,948 | 11/1938 | Lienau et al. | 414/327 X |
| 2,880,892 | 4/1959 | Wheeler et al. | 414/300 |
| 3,063,582 | 11/1962 | Steffensen | 414/177 |
| 3,435,967 | 4/1969 | Sackett | 414/272 |
| 3,490,615 | 1/1970 | Sackett | 414/268 |
| 3,501,030 | 3/1970 | Flink | 198/530 |
| 3,869,050 | 3/1975 | Michel | 414/268 |

Primary Examiner—Robert G. Sheridan

Attorney, Agent, or Firm—Hill, Van Santen, Steadman, Chiara & Simpson

[57] ABSTRACT

A large volume of recovered solid discrete waste material is adapted to be stored over a large storage area at the bottom of large volume bin space within a building having opposite sides and opposite ends and providing an enclosing housing having upstanding walls rising to a substantial height along the sides and ends of the storage area and a covering roof at the tops of the walls, a loading conveyor system being operative adjacently under the roof at the top of the bin space for filling the material into the bin space thoroughly over the storage area. In a semi-automated embodiment of the invention, the stored material is adapted to be discharged selectively from one end of the storage area onto a take-away conveyor, or at any of a plurality of selected places along one side of the storage area onto a take-away conveyor. In a fully automated embodiment of the invention, all stored material is selectively discharged from one side of the storage area by means of selectively operable conveyors to be transported on a take-away conveyor. In either embodiment, there is a first in, first out capability.

26 Claims, 11 Drawing Figures

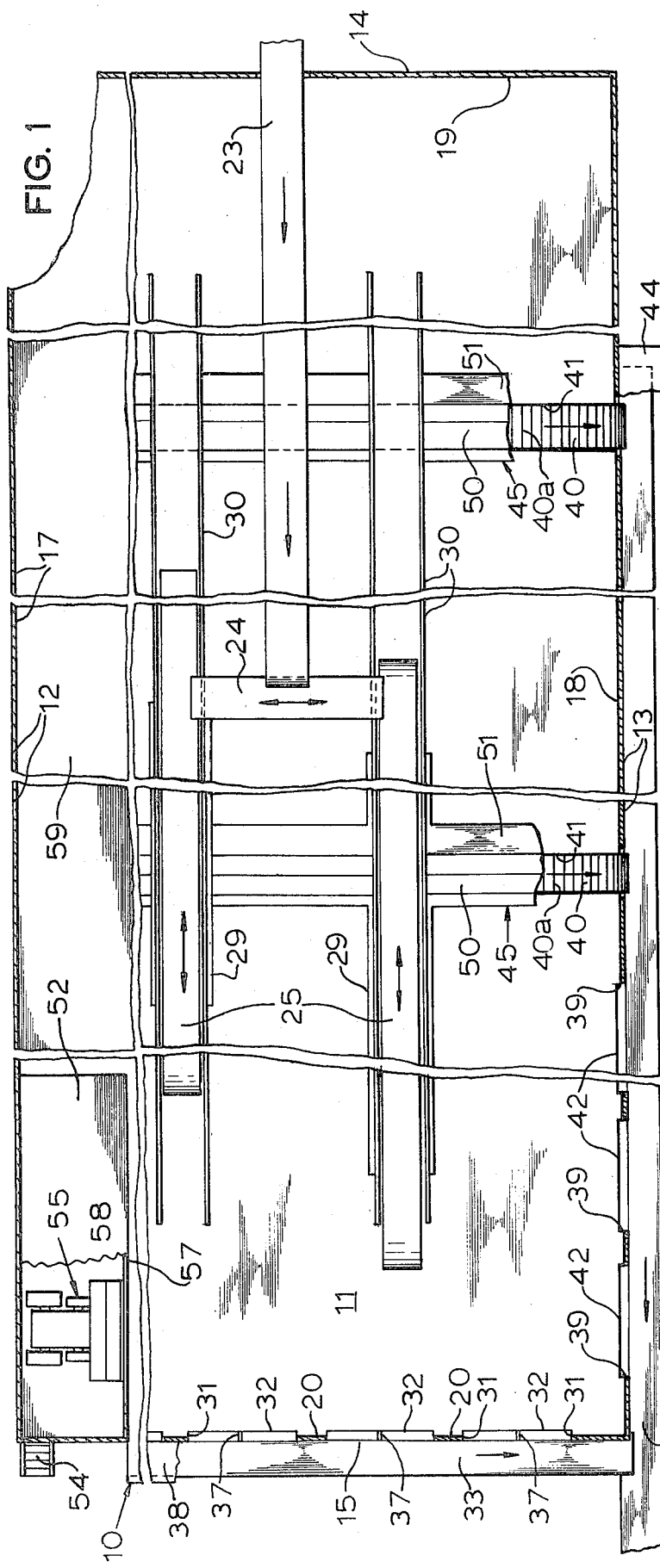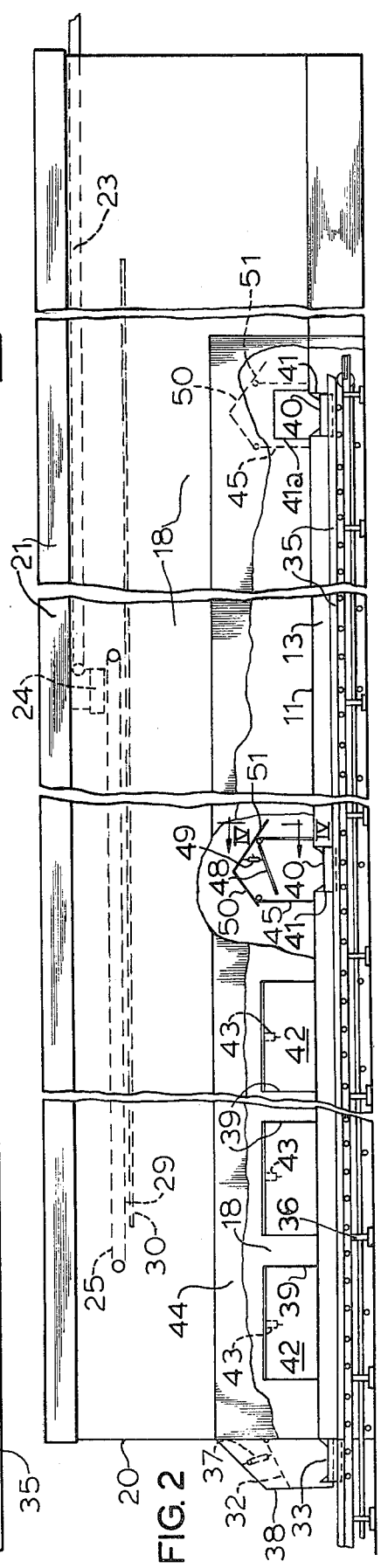

RECOVERED SOLID WASTE STORAGE BUILDING AND METHOD

This invention relates to the storage and supplying of large volumes of recovered solid discrete waste material such as combustible materials derived from municipal waste.

Salvaging of the large volumes of combustible fraction present in municipal wastes is receiving ever greater attention as primary fuel supplies dwindle and costs increase. The salvaged waste material sorted from municipal waste is generally shredded and of a particulate fibrous nature. Such material may be used for various industrial purposes, such as for fueling industrial boilers, electrical utility boilers, to serve as a fuel fraction in cement kilns, and the like. For such uses large supplies of the material must be maintained to assure efficient, continuous 24 hour and weekend operation of the material-consuming facility. A major problem has existed in the storage and handling of larger volumes of the particulate, fibrous, and more particularly generally flocculent material. Storage and supply for weekend operations, generally consisting of at least 2½ days, have presented a special problem because waste-pickup is generally suspended during that time interval, while nevertheless the material-consuming facility may require continuous supply of the material. From time to time other interruptions in acquiring supplies of the municipal waste recovered material may be occasioned by sorting or classifying equipment service shut-down, severe weather inhibiting waste pickup, or the like, so that a carry-over stored supply of the material is necessary to maintain continuous operation of the material consuming facility.

It is to the alleviation of the aforementioned problem that the present invention is directed, and an important object is to provide for the storage and supplying of recovered solid discrete waste material at least in a sufficient volume to provide a reserve supply sufficient to tide over intervals during which inflow of the material is temporarily suspended or slow while nevertheless operation of a material-consuming facility must continue without interruption.

Another object of the invention is to provide large volume storage and supply facilities.

A further object of the invention is to provide a new and improved method of storing and supplying recovered solid discrete waste material.

According to an embodiment of the invention, there is provided an at least semi-automated solid discrete material storage building, comprising a large material storage area having opposite sides and opposite ends, a housing having upstanding walls rising to a substantial height along said sides and ends of the storage area, and a roof at the top of said walls overlying said storage area over a large volume space below said roof and between said walls, means comprising a loading conveyor system adjacently under said roof at the top of said space for filling material into the storage area, means adapted for discharging material from the storage area selectively at a plurality of places along one of said sides of said storage area, and means for receiving and handling the material discharged at any of said places along said one side. Means may also be provided for discharging material from one end of the storage area, and means for receiving and handling the material charged from said one end.

The invention also provides a method of storing and supplying solid discrete material, comprising storing a large volume of solid discrete material in a large material storage area having opposite sides and opposite ends and enclosed by a housing having upstanding walls rising to a substantial height along said sides and ends of the storage area and a roof at the top of said walls overlying a large volume space over said storage area and bounded by said area walls and roof; operating a loading conveyor system adjacently under said roof at the top of said space and filling material into said space, and discharging material from said storage area at any of a plurality of selected places along one of said sides of the storage area onto receiving and handling means. Material may also be discharged from one end of said storage area onto receiving and handling means.

Other objects, features and advantages of the invention will be readily apparent from the following description of certain representative embodiments thereof, taken in conjunction with the accompanying drawings, although variations and modifications may be effected without departing from the spirit and scope of the novel concepts embodied in the disclosure and in which:

FIG. 1 is a schematic, fragmentary, top plan view of a storage building according to one embodiment of the invention.

FIG. 2 is a schematic, fragmentary side elevational view of the storage building.

Figure 3:
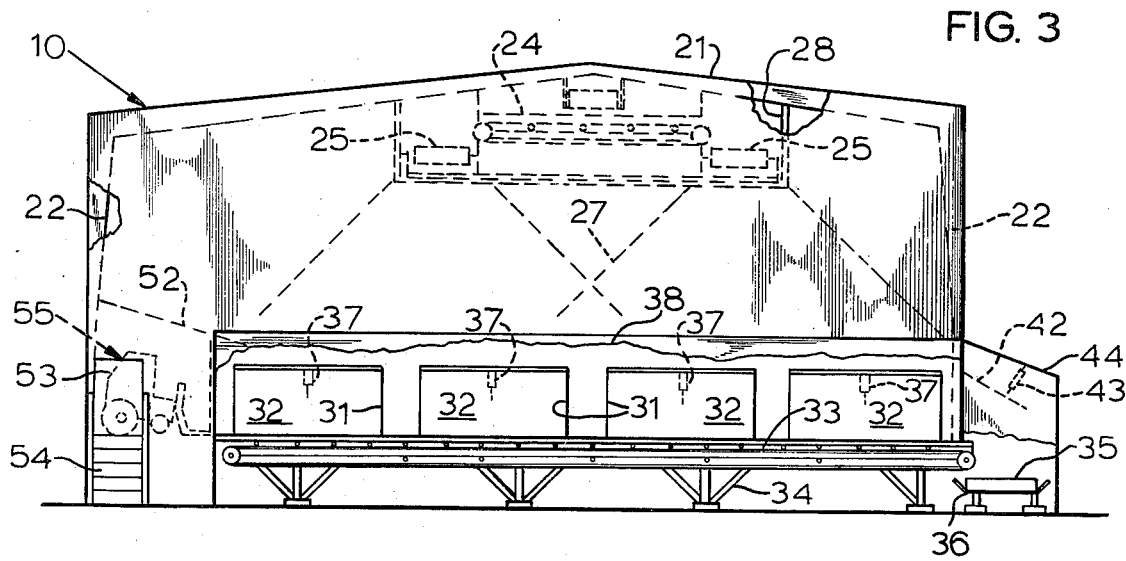
FIG. 3 is a schematic small scale end view of the building.

In order to handle in a semi-automatic manner a large volume of recovered solid discrete waste material such as shredded combustible materials derived from municipal wastes, there is provided a large size storage building 10 (FIG. 1) comprising a large material storage area floor 11 having opposite sides 12 and 13 opposite ends 14 and 15. Although the floor 11, as shown in FIG. 1, is rectangular, it may have any other suitable polygonal shape. An elongate format wherein the sides 12 and 13 are of greater length than the ends of 14 and 15 is the preferred arrangement. Upstanding walls 17 and 18 rise to a substantial height along the sides 12 and 13, respectively, of the floor. Upstanding walls 19 and 20 rise to a substantial height along the opposite ends 14 and 15, respectively, of the floor. A roof 21 (FIGS. 2 and 3) at the top of the walls overlies the storage area floor 11 over a large volume bin space below the roof and between the walls. Suitable frame structure 22 is provided for supporting the roof 21 and the several walls on or at least in enclosing relation to the floor 11. In a practical arrangement, the building 10 may provide a storage area of about the size of a conventional football field and capable of storing up to 2,000 tons of combustible waste material. For example, the floor area of the building may be up to 300 ft. by 80 ft. and the height of the building may be about 50 ft., or as required for maximum storage volume for any particular installation.

Means are provided for filling or loading discrete material into the enclosed space within the building 10 onto the floor 11. In a practical arrangement, a loading conveyor system is located adjacently under the roof 21 at the top of the space within the building 10 for filling material into the space onto the floor 11, and may comprise an endless input conveyor 23 delivering to a reversible endless transverse conveyor 24 for selectively transferring the discrete material delivered by the conveyor 23 onto respective reversible endless loading conveyors 25 located in spaced relation longitudinally over the floor 11 so as to deposit the material into large longitudinally extending windows as indicate at 27 in FIG. 3. Support for the conveyor system is provided by a suitable frame structure 28 which may be suspended from the girders of the framework 22 supporting the roof 21. The conveyors 25 may be mounted on reversible carriages 29 adapted to run along respective tracks 30. Any preferred means for operating the conveyor system may be employed comprising electrical, mechanical, hydraulic or pneumatic circuitry and devices well known for operating conveyor systems.

Means are provided for discharging material with the assistance of material moving equipment such as a bulldozer, selectively, from at least one side of the floor and desirably also from at least one end of the floor. For this purpose, means adapted for discharging material from one end of the floor, herein the end 15, comprise a plurality of ports 31 normally closed by respective doors 32. Each of the ports 31 and doors 32 may be about 8 ft. high and 16 ft. wide. Each of the doors 32 is preferably hingedly attached along its top edge to the wall 20 so that by swinging the door 32 outwardly as indicated in dash outline in FIG. 2, the associated discharge port 31 will be opened and the door may serve as a downwardly and outwardly slanting deflector for directing material discharged through the port onto receiving and handling means comprising an endless take-away conveyor 33 mounted on a suitable supporting frame 34 to run adjacently below and along the floor end 15 to carry the discharged material to a suitable discharge point which may be provided by receiving and handling means comprising a take-away conveyor 35 running along one of the sides of the floor 11, herein the side 13 and supported by suitable frame structure 36. Actuation of the doors 32 between the fully closed and open positions may be effected by suitable actuators 37 which may comprise hydraulic or pneumatic cylinder and piston devices attached to structure such as a housing 38 protectively enclosing the conveyor 33 and the plurality of horizontally spaced ports 31 and the doors 32.

In addition to the end unloading of material from within the building 10, means adapted for discharge of material from at least one side of the floor 11, herein the side 13, comprise either simply ports 39 in the side wall 18, similar to the ports 31 in the end wall 20, or a plurality of transversely running, endless conveyors 40 spaced at longitudinal intervals along the floor 11 and running in respective trenches 41 in the floor, or both of these discharge facilitating means. For example, the ports 39 may be, if preferred, spaced apart longitudinally at floor level at suitably fairly close intervals in the side wall 18 throughout the length of the side wall. On the other hand, instead of the ports 39 additional of the transverse fuel discharge conveyors 40 may be installed in the floor 11. As shown in FIGS. 1 and 2, a plurality of the spaced ports 39 is provided in a substantial length of the side wall 18 adjacent to the end wall 20, in combination with the discharge conveyors 40 which are located at suitable spaced intervals longitudinally along the floor 11 between the portion of the installation having the ports 39 and the rear wall 19. Respective discharge clearance openings 41a in the side wall 18 and aligned with the outer ends of the trenches 41 (FIG. 2) facilitate operation of the conveyors 40 for discharging material onto the conveyor 35.

Each of the discharge ports 39 is desirably equipped with a normally closed closure door 42 hingedly mounted along its top edge to the wall 18 at the top of the associated port 39 and adapted to swing to open position outwardly substantially as shown in FIG. 3. Similarly as described for the doors 32, the doors 42 are adapted to be actuated by means of actuators 43 such as piston and cylinder actuators which may be mounted for this purpose on a protective housing 44 enclosing the conveyor 35 and the ports 39 and doors 42 along the wall 18 and the floor side 13.

Figure 4:
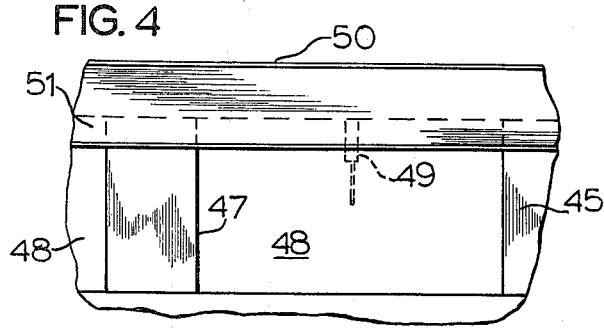
FIG. 4 is a fragmentary vertical sectional detail view taken substantially along the line IV—IV of FIG. 2.
Figure 5A:
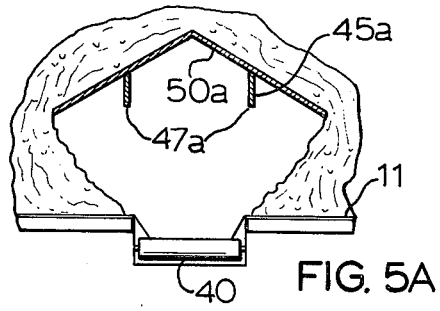
FIG. 5a is a fragmentary schematic view showing a modified conveyor shed arrangement.

In order to avoid clogging the transverse conveyors 40 but still to permit reception thereon of material from the stored load in the building 10, they are protectively enclosed by means of respective sheds 45 which extend transversely relative to the floor 11 preferably throughout the length of the associated conveyor 40. The sheds 45 are preferably just wide enough to clear the respective trenches 41 and are of a height to accommodate discharge ports 47 (FIG. 4) located in at least one side wall of each of the sheds 45 and at suitable spaced intervals substantially throughout the length of such shed side wall. Each of the ports 47 is normally closed by means of a closure door 48, which, similarly as the doors 32 and 42, is hinged along its top edge to the shed 45 along the top of the associated port 47 so that the door can be swung inwardly relative to the shed into overhanging relation to the discharge conveyor 40. For actuating the doors 48 between closed and opened positions, respective powered actuators such as piston and cylinder actuators 49 may be connected between the doors preferably on their inner side and a superstructure such as a roof 50 desirably of the peaked type with a sloping eave overhang 51 over the ported wall of the shed. Thus, the conveyors 40 are maintained free from the load of material within the building 10 until material is selectively discharged onto the conveyors 40 through one or more of the ports 47. Opening of the doors 48 is easily effected because they are adapted to swing inwardly into the free space within the associated shed 45. The actuators 49 are always fully protected against pressure from the material overburden because they are inside the shed. Undue pressure against the doors 48 from the stored material in the building is relieved by means of the eave overhand 51 which diverts the overburden load to at least a substantial extent. In the illustrated example, the ports 47 are on the sides of the sheds 45 facing toward the end wall 19 and opposite to the side which faces the ported end wall 20 of the building. If preferred, both sides of the sheds may be ported, or the side nearest the end wall 20 may be ported, or either selected side of either of the sheds 45 may be ported, as preferred under the optimum operating conditions for any installation. If preferred, as shown in FIG. 5a, one or more sheds 45a may be provided having peaked roof 50a with relatively wide sloping eaves 51a overhanging constantly open ports 47a along the lengths of the side walls. The overhand extent of the eaves 51a should sufficient to control the angle of repose of the stored material below the eaves to maintain the conveyors 40 substantially free from being choked during shutdown intervals but nevertheless permit free and easy loading of these conveyors when in operation. In smaller installations where the vertical material loads are moderate, so that choking of the conveyors 40 would not be a problem, the sheds 45 or 45a may not be needed. For positive transportation of material on the conveyors 40, they are desirably provided with transverse cleats 40a (FIG. 1)

As will be clear, the storage space within the building 10 may be fully or partially filled with material, as preferred. In general, for maximum utility in providing a reserve supply of material for operating a material-consuming facility for a layover such as a weekend or other interval during which material source such as municipal refuse collection is shut down, the storage space within the building 10 should be loaded to maximum reserve storage capacity. Loading of the storage space may continue for as long as source material is being processed and until full load capacity of the storage space is reached. During the loading or filling interval, the overhead loading conveyor system is operated as required. If there is no demand for material from the storage building 10, the take-away conveyors 33 and 35 and the discharge conveyors 40 may be shut down. It will be understood, of course, that these conveyors are adapted to be operated in any preferred manner individually or in coordinated relation by suitable driving means which may be electrically or otherwise powered and which may be controlled from a central control station, as is customary for conveyor equipment. Conveniently, the control station may be located within a shed 52 (FIGS. 1 and 3) at the side 12 of the floor 11 inside the building 10 and, for example, in the corner where the side wall 17 joins the end wall 20. Access into the shed 52 from the outside of the building 10 may be by way of an entry which may be closed by a door 53 and to which access may be gained by means of a stairway 54.

Another function for the shed 52 may be to house self-propelled material ejection pusher means such as a bulldozer 55 when the bulldozer is not in use. When it is desired to use the bulldozer 55 for ejecting material from the building 10, the bulldozer is driven through a suitable opening or doorway 57 in the inner wall of the shed 52 and which doorway may normally be closed by means of a closure 58 against ingress of material during loading of the storage space. The closure 58 may be in any preferred form such as a roll-up door or a sliding door or the like. In a typical feedout or discharge ejection operation, one or more of the end doors 32 may be opened by the operation suitable controls such as may be operable from the control room within the shed 52, and the bulldozer 55 operated to push fuel from within the housing 10 through the open discharge ports 31 onto the conveyor 33 which for this purpose is set into operation to carry the discharged material onto the conveyor 35 which will also have been placed into operation. As the area of the floor 11 nearest the discharge ports 31 is cleared of material, discharge of material may be effected selectively through the side wall discharge ports 39. After the area between the end wall 20 and the nearest transverse conveyor 40 has been depleted of material, the bulldozer 55 is adapted to be maneuvered by way of a tractor alley 59 along the side wall 17 into position to discharge material by pushing it onto any selected one of the transverse conveyors 40 through any selected one of the discharge ports 47 in the associated shed 45. It will be understood, of course, that as an incident to delivering material by way of any of the transverse conveyors 40 to the take-away conveyor 35, the conveyor 40 in use will be placed into operation.

Under circumstances where it may be necessary to supply the solid discrete waste material from the building 10 while material is being loaded into the building from sorting, classifying, processing, supplying equipment by way of the overhead conveyor system, the loading conveyors 25 or either of them can be operated to deposit the new material toward the end of the storage space away from the area in which discharge delivery of material is taking place. For example, if the bulldozer 55 is operating in the front in the vicinity of the end wall 20 or the adjacent transverse conveyor 40, the conveyor 25 which is in loading operation may be operated to dump near the rear of the storage space. On the other hand, if the discharge operation is in effect near the rear of the storage space, the operating loading conveyor 25 can be operated to dump toward the front of the storage space. This affords a desirable first in, first out cycling sequence. Material is loaded into the storage space cyclically progressively from one end of the space to the opposite end of the space, and material is discharged progressively from the space starting at said one end and working successively to the other end in a cycle which trails and follows the loading cycle, so that in cyclical sequence the first material loading into the bin space is the first material discharged from the bin space.

Figure 5:
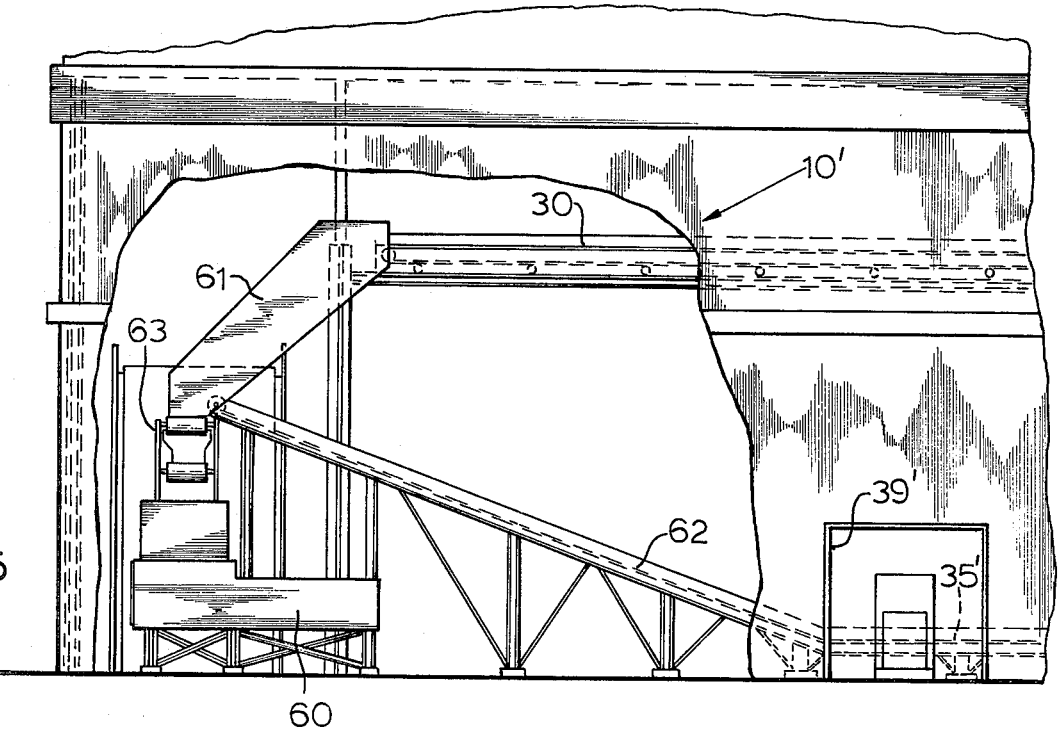
FIG. 5 is a fragmentary schematic side elevational view showing a modified means for dispensing the material derived from the storage building.

For some purposes it may be desirable to compact the recovered waste material. For this purpose, apparatus such as depicted in FIG. 5 may be used wherein the material is delivered from the storage building 10' to one or more compactors 60. The material may be delivered to the compactor 60 either by way of a chute 61 into which the adjacent end of the overhead conveyor 31' may selectively discharge, or the material may be transported as by means of an inclined delivery conveyor 62 leading from the delivery end of the take-away conveyor 35' to the upper end of an intake 63 for the compactor 60. Through this arrangement the compactor 60 or a battery of such compactors can be continuously operated without interruption in the supply of the waste material delivered either by means of the shute 61 or from the reserve supply of the material supplied to the conveyor 35' through anyone of the selected side ports 39'.

A storage building 64 (FIGS. 6 and 7) embodying the present invention is adapted for fully automatic operation. That is, loading of material into the building and delivery of material from the building is accomplished without need for a manned discharge vehicle such as a bulldozer, but entirely by means of a system of conveyors. The building 64 may therefore be constructed and arranged to accommdate a substantially larger volume of the recovered solid discrete waste material. To this end, the building 64 comprises a sturdy frame 65 supporting a roof 67 and smooth inside surface spaced upright and generally divergently related opposite side walls 68 and 69 which are desirably of substantial height and substantially elongated in a front to rear direction. At its rear end the building is closed by a rear wall 70 and at its front end the building is closed by a front wall 71. Access to an observation and control room 72 at the top of the front wall 71 may be gained through a stairway 73 leading from ground level.

Shredded, discrete fibrous recovered waste material may be supplied through the roof 67 from a processing plant by way of a supply duct 74 into a cyclone 75 desirably mounted on the central portion of the roof 67 and having a discharge funnel 77 discharging into the top of the space within the building 64 onto a load distribution conveyor 78 operating longitudinally in the top of the building space.

Figure 8:
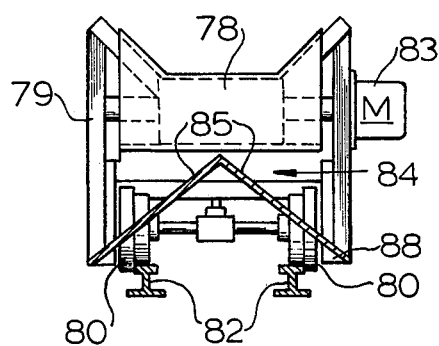
FIG. 8 is an enlarged end elevational view taken substantially along the line VIII—VIII of FIG. 6 and showing an end of the loading conveyor.
Figure 9:
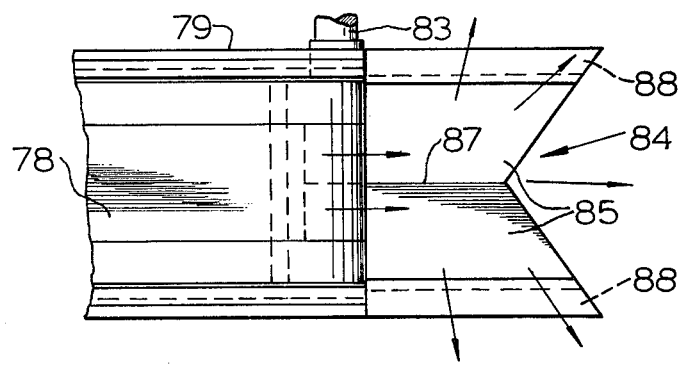
FIG. 9 is a fragmentary top plan view of the end of the conveyor shown in FIG. 8.
Figure 10:
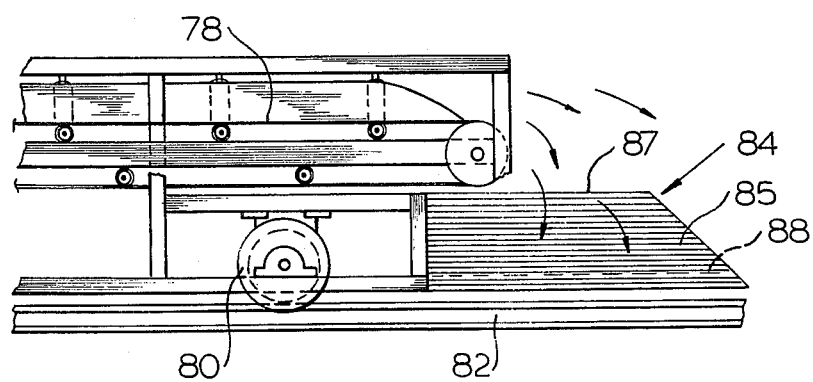
FIG. 10 is a side elevational view of that portion of the conveyor shown in FIGS. 8 and 9.

In a preferred form, the conveyor 78 is of the reversible endless belt type mounted on a carriage 79 carried by flanged wheels which, at least at one end of the carriage 79 are driven by power means such as a reversible electric motor 81 (FIGS. 8 and 10) suitably supported by the carriage 79 under the conveyor 78. Thereby the carriage 79 is adapted to be driven longitudinally along tracks 82 mounted centrally longitudinally in the top of the space within the building 64 as close as practicable under the roof 67. By having the conveyor about half as long as the length of the interior of the building 64, and by having the conveyor 78 reversibly driven as by means of a reversible motor 83, it is possible to substantially fully load the space within the building 64 below the conveyor by starting the loading from one end of the conveyor 78 adjacent to one end of the building and progressively advancing the conveyor toward the opposite end of the building timed with supplying of material to the conveyor from the supply cyclone 75 so that the bin space within the building is progressively filled to about the half way point. Then by reversing operation of the conveyor 78 and effecting traverse of the carriage 79 toward the starting point timed with respect to supplying of material from the cyclone 75, the remainder of the bin space within the building can be progressively filled.

In order to assure substantially uniform distribution of material into the bin space within the building 64 from either end of the reversible conveyor 78, each end of the conveyor is equipped with a spreader device 84 (FIGS. 6 and 8–10). In a desirable form, the spreader device 84 comprises a pair of substantially equal spreader plates 85 joined at and diverging downwardly from a ridge 87. At their inner ends the joined plates 85 underlie the loading conveyor 78, and at their outer ends the spreader plates project a substantial distance beyond the conveyor to control and assure efficient, thorough spreading of the material from the conveyor 78 across the width of the bin space therebelow. Ridig frame means 88 supports the respective spreader 84 at each end of the conveyor carriage 80. For spreading efficiency, the outer end of the spreader 84 is formed to permit material to spill from the end of the spreader as well as its sides. To this end, the outer ends of the plates 85 diverge generally V-form longitudinally as well as laterally from the peak 87 whereby to permit about the same volume of material to spill endwise through the V-gap as the volume of material which is diverted by the plates 85 to spill laterally from each side of the spreader 84, substantially as indicated by the directional arrows in FIGS. 9 and 10.

Material loaded into the bin space in the building 64 is received in the large storage area at the bottom of the bin space on a distribution floor 89 comprising a system of downwardly diverging surfaces 90 extending substantially across the width of the floor and terminating at spaced apart lower edges defining therebetween discharge openings 91 which funnel the material onto transverse delivery conveyors 92 selectively driven as by means of variable speed motors 93. At one of their ends, the conveyors 92 are oriented to discharge material funneled onto them by the sloping floor surfaces, such ends being in the present instance at the side 69 of the building. At the opposite side, floor surfaces 94 cooperate with the surface 90 to divert the material away from the wall 68 onto the conveyors 92. In this instance there are four of the discharge openings 91, the floor area thus being divided into four substantial equal bin sections. Support of the floor 89 over the conveyors 92 is desirably effected by means of frame structure 95 which may be connected to the building frame 65.

Figure 6:
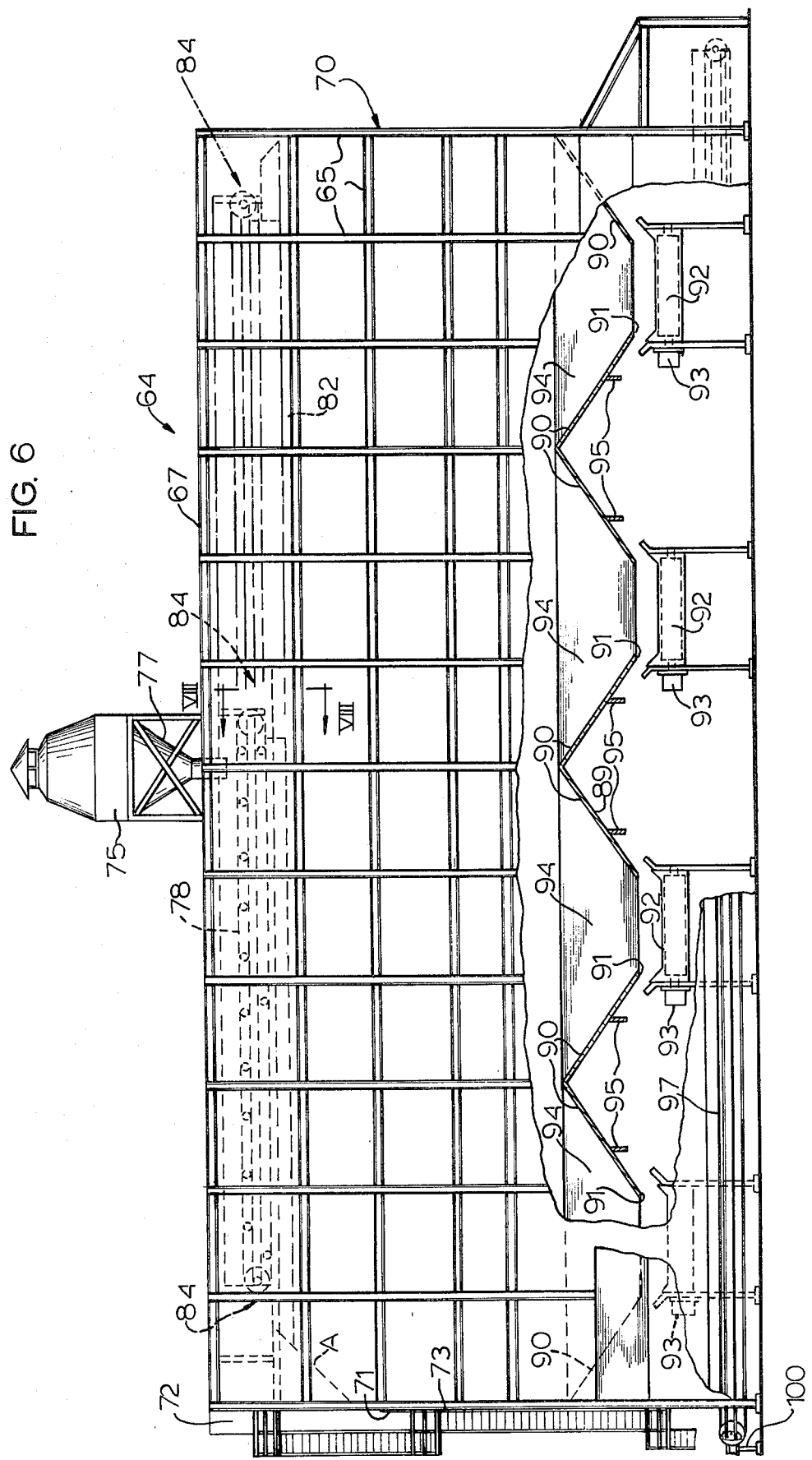
FIG. 6 is a schematic side elevational view, partially broken away for illustrative purposes, depicting another embodiment of the invention.
Figure 7:
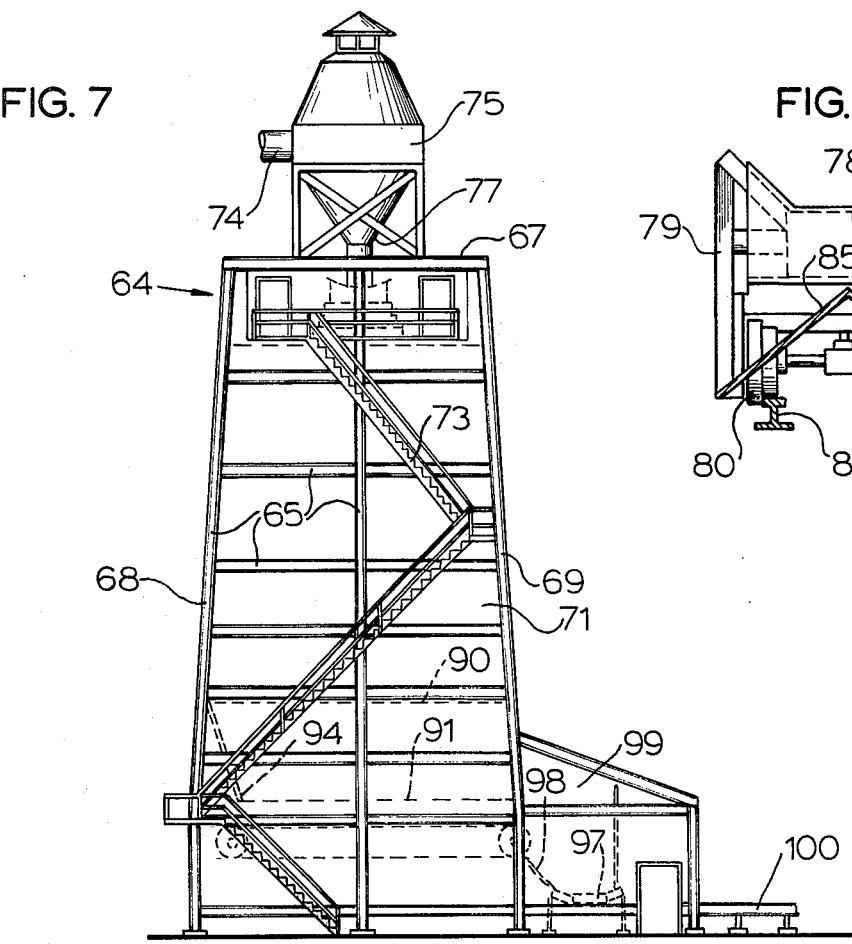
FIG. 7 is an end elevational view of the embodiment of FIG. 6.

Discharge of material from the conveyors 92 is received on conveyor means comprising an endless takeaway conveyor 97 mounted adjacently below the discharge ends of the discharge conveyors 92. A slanting baffle 98 may be provided as best seen in FIG. 7 to direct discharge material from the conveyors 92 onto the take-away 97 which may conveniently be housed in a shed 99 extending lengthwise along the lower portion of the side wall 69. Any preferred or conventional driving means may be provided for driving the conveyor 97 to advance material deposited thereon toward one end such as left hand end as shown in FIG. 6 where the material is discharged from the conveyor 97 for further processing or transportation. For example, a delivery conveyor 100 may receive the material from the conveyor 97 to transport the material to a point of use or further processing.

In operation of the storage facility provided by the building 64, the bin space is loaded starting at one end of the building, for example at the end 71, and progressing throughout the length of the building to the opposite end. At start of the filling operation at the end 71 of the building, the adjacent discharge end of the loading conveyor 78 is desirably located a sufficient distance from the end wall 71 to provide an angle of repose A (FIG. 6) which will afford an empty space thereabove whereby to reduce load on the conveyor 92 thereunder. Assuming that the bin space has been filled starting at the first conveyor 92 which is located near the end wall 71, feed-out of the stored material may also be initiated at that end of the storage facility. Then, as material in the bin section over the first discharge conveyor 92 is substantially exhausted, it will be apparent that there will be some spilling of the material from at least the upper volume of stored material over the second of the conveyors 92 counting from the wall 71 so that the load on that conveyor 92 is somewhat alleviated by the time the second discharge conveyor is operated to discharge stored material. Each succeeding one of the discharge conveyors 92 may then be successively placed in operation. In the meantime, the loading conveyor 78 is adapted to be operated after having completed filling of the bin space up to the end wall 70 to again fill the bin space near the end wall 71 and then progressively to the opposite end of the bin space. Desirably the stored material should be successively discharged from the bin space on a first in, first out sequence so as to avoid undue compaction in any part of the bin space as might occur if prolonged stagnation is permitted. It will be understood, of course, that suitable electrical controls may be provided for selective, automatic coordinated operation of the various conveyors in the storage facility.

It will be understood that variations and modifications may be effected without departing from the spirit and scope of the novel concepts of this invention.

I claim as my invention:

1. An at least semi-automated solid discrete material storage and retrieval bin building especially adapted for the storage and retrieval of large volumes of recovered combustible shredded particulate fibrous flocculant municipal waste fuel material, comprising:
   a housing having a roof at the top of a large material volume capacity storage bin space of substantial height over an elongate material supporting area having opposite elongate sides and opposite ends;
   means comprising a loading conveyor system adjacently under said roof for filling said material to a substantial depth in said bin space throughout the length and breadth of said supporting area in a progressive cycle starting at one end of said area and continuing throughout the length of said area to the opposite end of said area;
   first means for starting a material retrieval unloading cycle by discharging a full depth increment of the material from said supporting area along said one end of said area;
   means for receiving and handling the material discharged along said one end of said supporting area;
   second means for continuing the retrieval discharge of material from said supporting area in sequence after said first means and adapted for discharging full depth increments of the material from said supporting area progressively at a plurality of places along one side of said area starting adjacent to said one end and advancing place-by-succeeding-place to said opposite end;
   and means for receiving and handling the material discharged at said places along said one side;
   said first and second means functioning in a progressive material unloading discharge cycle which trails and follows the loading cycle of said loading conveyor system throughout the length of said storage area, so that there is assurance that the full depth of material loaded into the bin space by said loading conveyor system will be retrieved and discharged from the bin space in a first in, first out sequence through the length and breadth of said supporting area in each material retrieval and discharge cycle.

2. A storage building according to claim 1, wherein said means for receiving and handling the material discharged at any of said places along said one side comprise a take-away conveyor running along said one side of the storage area, and a conveyor running along said one end to receive the material, one of said conveyors discharging onto the other of said conveyors.

3. A storage building according to claim 1, wherein said loading conveyor system comprises a transport conveyor for transporting material from a source into the building, a transverse transfer conveyor receiving material from said transport conveyor, and a pair of spaced selectively operable loading conveyors selectively receptive of material from respective opposite ends of said transfer conveyor, said loading conveyors being operable to load material to different portions of said storage area.

4. A storage building according to claim 3, wherein said transport conveyor and said loading conveyors extend longitudinally parallel to said sides, and said loading conveyors are carried by carriages shiftable along longitudinal tracks.

5. A storage building according to claim 3, wherein said transfer conveyor and said loading conveyors are of the endless type and are reversible.

6. A storage building according to claim 1, comprising discharge ports in the end wall at said one end of the storage area and adapted for said discharging of material from one end of said area, closures for said ports hinged along top edges thereof and adapted for swinging open from a closed position into an open position outwardly into overlying downwardly slanting relation to said means for receiving material discharged along said one end and said closures adapted to serve as downward deflectors for the material discharged through said ports, and means for moving said closures between closed position and open position relative to the respective ports.

7. A storage building according to claim 1, wherein said means adapted for discharging material from said one side of said storage area comprise a plurality of discharge ports in the side wall along said one side, closures for said discharge ports, and means for opening and closing said closures, said closures being hinged along upper edges thereof and being adapted for swinging open from closed position into open position outwardly into overlying downwardly slanting relation to said means for receiving the material discharged along said one side, and said closures being adapted to serve as deflectors for the material discharged through said ports.

8. An at least semi-automated solid discrete material storage bin building according to claim 1, wherein said area comprises a floor, said second means comprising discharge conveyor means at substantially spaced intervals operating in trench means in said floor and there being substantial areas of the floor between said trench means, and large enough to permit moving thereon means for pushing the discrete material from said floor areas into said trench means onto said conveyor means for discharge from said bin space; and protective shed means overlying the trench means at a height sufficient to permit pushing of the discrete material into the trench means by operation of the pushing means on said floor areas.

9. A storage building according to claim 8, including a pusher machine housing shed having an opening providing access to said floor for operating a pusher machine from the shed over said floor.

10. A storage building according to claim 9, wherein said pusher machine shed is located on said floor in a limited area adjacent to one end of the floor, an access doorway from the shed onto said floor, and a closure for said doorway movable between open and closed positions.

11. A storage building according to claim 10, including an alley on said floor for maneuvering the machine longitudinally along the floor into different selective operating locations.

12. A material storage building according to claim 1, wherein said storage area comprises a plurality of selectively operable transverse conveyors located at spaced intervals, and floor means between the conveyors for directing material from the load in said space onto said selectively operable conveyors.

13. A material storage building according to claim 1, wherein said loading conveyor system comprises an elongate endless conveyor, means for operating the conveyor longitudinally selectively reversibly, a carriage supporting the conveyor, elongate track means supporting the carriage longitudinally reciprocably, means for driving the carriage selectively reciprocably along said track means, and spreader means at the opposite ends of said carriage receptive of material from the ends of said conveyor to spread the material substantially uniformly to each side of the track means and over said storage area in said space.

14. A storage building according to claim 13, wherein said spreader means comprise rigid downwardly divergently related surfaces stationary on said carriage, and edges at the ends of said surfaces remote from the conveyor for controlling endwise distribution of material in cooperation with lateral distribution of material by said divergent surfaces.

15. An at least semi-automated solid discrete material storage building according to claim 1, comprising:
compactor means, and
means for directing material to said compactor means from said means for receiving and handling the discharged material at said one side and from said loading conveyor system.

16. A method especially adapted for the storage and retrieval of large volumes of recovered combustible shredded particulate fibrous flocculant municipal waste fuel material, comprising:
storing a large volume of said material in, and retrieving and discharging the material from a large material volume capacity elongate material storage bin space over a material supporting area having opposite elongate sides and opposite ends, within a housing having a roof at a substantial height above said supporting area over said bin space;
filling said material into said bin space to a substantial depth throughout the length and breadth of said supporting area by operating a loading conveyor system adjacently under said roof at the top of said bin space in a progressive cycle starting at one end of said area and continuing throughout the length and breadth of said area to the opposite end of said area;
starting a material retrieval unloading cycle by discharging a full depth increment of the material from said supporting area along said one end of said area;
receiving and handling the material discharged along said one end of said supporting area;
continuing the retrieval discharge of material from said supporting area in sequence after said starting and discharging full depth increments of the material from said supporting area progressively at a plurality of places along one side of said area starting adjacent to said one end and advancing place-by-succeeding-place to said opposite end;
receiving and handling the material discharged at said places along said side;
and performing said starting and continuing of the retrieval and discharge of material in a progressive cycle trailing and following the loading cycle throughout the length of said storage area, so that there is assurance that the full depth of material loaded into the bin space by said loading conveyor system will be retrieved and discharged from the bin space in a first in, first out sequence throughout the length and breadth of said supporting area in each material retrieval and discharge cycle.

17. A method according to claim 16, comprising transporting material from source into the building on a transporting conveyor, receiving material from the transporting conveyor on a transverse transfer conveyor, selectively receiving material from respective opposite ends of said transfer conveyor onto a pair of spaced selectively operable loading conveyors, and loading material from said loading conveyors to different portions of said area on a first in, first out basis in coordination with said discharge of the material.

18. A method according to claim 16 comprising discharging material from said one end of the supporting area through discharge ports in the wall along said one end, normally closing said ports, and selectively opening said ports for discharging the material therethrough.

19. A method according to claim 16, comprising discharging material through selected discharge ports in the side wall along said one side of the supporting area.

20. A method according to claim 19, comprising closing said ports when loading said space, and opening said ports when discharging material therethrough.

21. A method according to claim 16, comprising operating discharge conveyor means in a plurality of spaced openings in floor means in said supporting area, said discharge conveyor means discharging through said one side of said storage area; and pushing the material from said floor means into said openings and onto said discharge conveyor means.

22. A method according to claim 21, comprising protecting said conveyor means by overlying shed means against clogging from the material load in said space, opening said shed means for access to the discharge conveyor means, and pushing material from adjacent area of said floor onto said discharge conveyor means through the opening.

23. A method according to claim 21, comprising directing material from the floor means through side openings selectively onto side takeaway conveyor means.

24. A method according to claim 16, comprising a pusher means on a floor comprising said supporting area, and employing the pusher means to discharge material from said floor by pushing the material from said floor onto one of said receiving and handling means.

25. A method according to claim 16, comprising storing a pusher machine in a shed having an access door to a floor comprising said supporting area, opening said door, running said pusher machine onto said floor and operating the pusher machine and thereby pushing material from said floor for discharging the material from said storage area.

26. A method of storing and supplying solid discrete recovered combustible shredded particulate fibrous flocculant municipal waste fuel material, comprising:
storing a large volume of such fuel in, and retrieving and discharging such fuel from, a large elongate material supporting area having opposite long sides and opposite ends and enclosed by a housing having upstanding walls rising to a substantial height along said sides and ends of the supporting area and bounded by said area, walls and roof;

said storing comprising operating a loading conveyor system adjacently under said roof at the top of said space and loading said fuel material into said space to a substantial depth onto said area in a cycle starting at one end of said space and continuing to the opposite end of said space;

and operating unloading means within said housing and thereby progressively retrieving and discharging and clearing out the material from said space by progressive full depth increments starting at said one end of said space and working successively to said other end of said space in a cycle which trails and follows said loading cycle;

so that in cyclical sequence there is a substantially complete progressive clearing out and replacement of the full depth of material from said bin space throughout the length and breadth of said supporting area in each cycle, and thus the first material loaded into the bin space is always the first material discharged from the bin space.

* * * * *